US010983799B1

(12) United States Patent
Reynolds et al.

(10) Patent No.: US 10,983,799 B1
(45) Date of Patent: Apr. 20, 2021

(54) SELECTION OF INSTRUCTIONS TO ISSUE IN A PROCESSOR

(71) Applicant: Apple Inc., Cupertino, CA (US)

(72) Inventors: Sean M. Reynolds, Cupertino, CA (US); Gokul V. Ganesan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 15/847,552

(22) Filed: Dec. 19, 2017

(51) Int. Cl.
*G06F 9/38* (2018.01)

(52) U.S. Cl.
CPC .......... *G06F 9/3851* (2013.01); *G06F 9/3836* (2013.01); *G06F 9/3855* (2013.01); *G06F 9/3867* (2013.01)

(58) Field of Classification Search
CPC .... G06F 9/4881; G06F 9/3836; G06F 9/3851; G06F 9/3867; G06F 9/3855
See application file for complete search history.

(56) References Cited

U.S. PATENT DOCUMENTS

| | | | |
|---|---|---|---|
| 5,822,559 A | 10/1998 | Narayan et al. | |
| 5,870,578 A | 2/1999 | Mahalingaiah et al. | |
| 5,872,947 A | 2/1999 | Narayan | |
| 6,256,720 B1 | 7/2001 | Nguyen et al. | |
| 7,269,712 B2 | 9/2007 | Cho | |
| 7,984,271 B2 * | 7/2011 | Sakamoto | G06F 9/30181 712/217 |
| 9,058,180 B2 | 6/2015 | Golla et al. | |
| 9,336,003 B2 | 5/2016 | Mylius et al. | |
| 9,632,790 B2 | 4/2017 | Iyer et al. | |
| 2008/0133889 A1 | 6/2008 | Glew | |
| 2012/0144173 A1 | 6/2012 | Butler et al. | |
| 2012/0144393 A1 | 6/2012 | Vinh et al. | |
| 2014/0215188 A1 * | 7/2014 | Mylius | G06F 9/3836 712/208 |
| 2016/0259648 A1 * | 9/2016 | Di | G06F 9/3836 |
| 2017/0286120 A1 * | 10/2017 | Kulkarni | G06F 9/3851 |
| 2017/0293489 A1 * | 10/2017 | Ayub | G06F 9/3836 |

* cited by examiner

*Primary Examiner* — Aimee Li
*Assistant Examiner* — Courtney P Carmichael-Moody
(74) *Attorney, Agent, or Firm* — Kowert, Hood, Munyon, Rankin & Goetzel, P.C.

(57) ABSTRACT

Techniques are disclosed relating to selection circuitry configured to select instruction operations to issue to one or more execution circuits of a processor. In some embodiments, an apparatus includes a plurality of execution circuits configured to perform one or more instruction operations. The apparatus may further include a plurality of instruction queues configured to store information indicative of the one or more instruction operations. In some embodiments, the apparatus may include a selection circuit configured to select a first plurality of instruction operations from a first instruction queue. The selection circuit may be configured to select a first instruction operation from the first plurality of instruction operations to issue to a first execution circuits. Further, the selection circuit may be configured to select a predesignated instruction operation of the first plurality of instruction operations to issue to a second execution circuit in response to a determination that no instruction operations in a second instruction queue are available to issue.

20 Claims, 8 Drawing Sheets

SELECTION OF INSTRUCTIONS TO ISSUE IN A PROCESSOR

BACKGROUND

Technical Field

This disclosure relates generally to the field of processors and, more particularly, to selecting instruction operations to issue in processors.

Description of the Related Art

A processor includes hardware circuitry designed to execute instructions defined in a particular instruction set architecture (ISA) implemented by the processor. A sequence of instructions as defined by the ISA can be provided to the processor to implement desired functionality in a system that includes the processor. Accordingly, the performance of the system is at least partially dependent on the processor's instruction throughput, or the number of instructions completed by the processor per unit of time.

Throughput may be increased by designing the processor to operate at high clock rates, where the clock is the signal that controls the capture and launch of digital signals in the processor circuitry. Further, throughput may be increased by implementing a pipelined processor design in which the processor circuitry includes multiple, parallel execution units configured to perform multiple instruction operations concurrently. A pipelined processor may include a selection circuit that is configured to select instructions to be performed concurrently by the multiple execution units. In some instances, however, the clock rate of a processor may be limited by the time required for each stage of the pipeline to perform its respective function. Thus, it may be desirable to implement a selection circuit that is capable of efficiently selecting instructions to be issued to various execution circuits during given clock cycles.

SUMMARY

Techniques are disclosed relating to selection circuitry configured to select instruction operations to issue to one or more execution circuits of a processor. In some embodiments, an apparatus includes a plurality of execution circuits configured to perform one or more instruction operations. In some embodiments, the apparatus further includes a plurality of instruction queues configured to store information indicative of the one or more instruction operations. Further, in some embodiments, the apparatus includes a selection circuit configured to select a first plurality of instruction operations from a first instruction queue, where each of the first plurality of instruction operations is selected from a respective non-overlapping subset of instruction operations in the first instruction queue. In some embodiments, the selection circuit may be configured to select a first instruction operation from the first plurality of instruction operations to issue to a first execution circuits. Further, in some embodiments, the selection circuit may be configured to select a predesignated instruction operation of the first plurality of instruction operations to issue to a second execution circuit in response to a determination that no instruction operations in the second instruction queue are available to issue.

Figure 1:
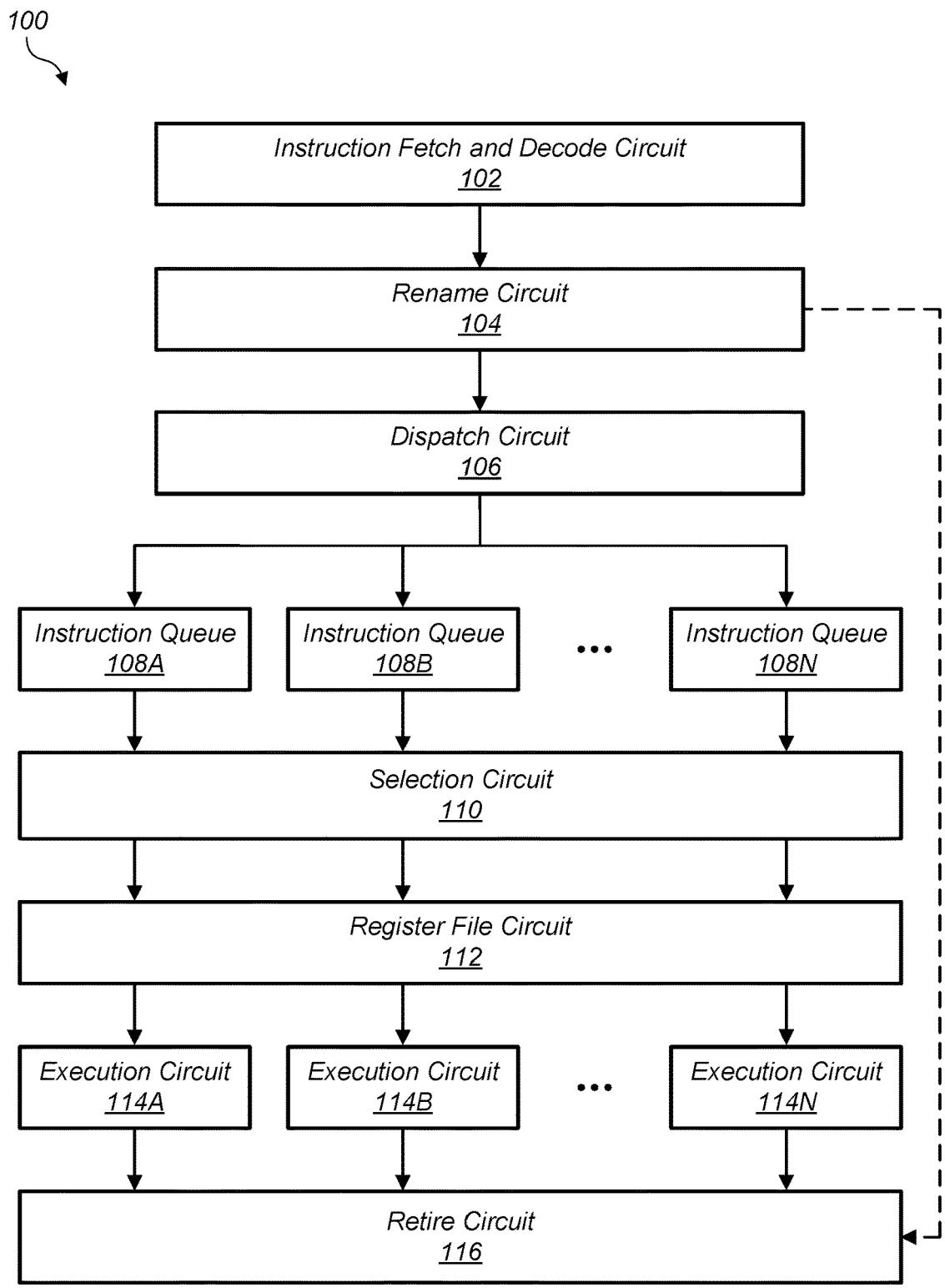
FIG. 1 is a block diagram illustrating an example processor, according to some embodiments.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

Although specific embodiments are described below, these embodiments are not intended to limit the scope of the present disclosure, even where only a single embodiment is described with respect to a particular feature. Examples of features provided in the disclosure are intended to be illustrative rather than restrictive unless stated otherwise. The description herein is intended to cover such alternatives, modifications, and equivalents as would be apparent to a person skilled in the art having the benefit of this disclosure.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. Rather, this application is intended to cover all modifications, equivalents, and alternatives falling within the spirit and scope of the disclosure of the present application as defined by the appended claims. The headings used herein are for organizational purposes only and are not meant to be used to limit the scope of the description.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "selection circuit configured to select an instruction operation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

DETAILED DESCRIPTION

In a pipelined processor, a selection circuit may be configured to select multiple instruction operations ("ops") to issue to multiple execution circuits (e.g., ALUs, LSUs, etc.) during each clock cycle. This selection process may, in some embodiments, be one of the most time-critical paths in the processor. For example, if the selection circuit is unable to select an op to issue to each of the multiple execution circuits during a given clock cycle, one or more execution circuits may not perform an op during that given clock cycle, decreasing the processor's throughput.

In view of this, some processors may implement a "unified" selection circuit to select ops to issue to the various execution circuits, in which the unified selection circuit may select between a large number of ops to issue to many execution circuits. Such an approach presents various shortcomings, however. For example, a unified selection circuit may require a relatively-large number of logic gates to implement, thereby increasing chip area and power consumption. Additionally, an increase in logic gates for the unified selection circuit may slow down this time-critical path, which, in turn, may compromise the ability of the unified selection circuit to select ops to issue to the execution circuits during a given clock cycle, particularly at high clock rates.

In some embodiments, a processor may implement a distributed selection circuit in which the circuitry configured to select ops is distributed across the execution circuits in the processor. In such embodiments, each execution circuit may have access to a subset of all ops to be processed by the processor.

Referring now to FIG. 1, a block diagram illustrating a portion of an example processor 100 is depicted, according to some embodiments. In various embodiments, processor 100 may be a pipelined processor configured to execute multiple ops in a given clock cycle. The concept of a processor "pipeline" is well understood, and refers to the concept of splitting the "work" a processor performs on instructions into multiple stages.

As shown in FIG. 1, processor 100 includes instruction fetch and decode circuit 102, which is coupled to rename circuit 104, which is further coupled to dispatch circuit 106. In various embodiments, instruction fetch and decode circuit 102 is configured to fetch one or more instructions from memory and decode the fetched instructions. The fetch and decode unit 102 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10A may be decoded into a single instruction operation, and thus the instruction operation may be essentially synonymous with instruction (although it may be modified in form by the decoder). The term "instruction operation" may be more briefly referred to herein as "op." Instruction fetch and decode circuit 102 may send the decoded ops to rename circuit 104. In some embodiments, rename circuit 104 may include one or more intermediate registers, or store a list of available free registers and/or free register tags, that may be used to store data values for use by one or more of execution circuits 114.

Rename circuit 104 may then send the ops to dispatch circuit 106, which may be configured to determine whether given ops may be performed in parallel, e.g., by detecting dependencies between ops, or if the given ops are to be performed serially. In various embodiments, dispatch circuit 106 may be configured to store (e.g., in one or more control tables) data corresponding to the status of the ops, such as the status of the operands to be utilized by the ops, whether an op has completed execution, etc., as well as the status of various execution circuits 114. Using this or other information, dispatch circuit 106 may, in various embodiments, be configured to determine initial ready information corresponding to the ops it receives from rename circuit 104. As used herein, "ready information" refers to information indicative of whether a given op is ready to be issued to an execution circuit. For example, consider an op for an ADD operation in which the operands to be utilized are not yet available. In such an instance, dispatch circuit 106 may be configured to generate ready information to indicate that the op is not ready to issue (e.g., by setting a particular data bit to logical "0"). When the operands for the ADD operation do become available, dispatch circuit 106 may be configured to update the ready information to indicate that the op is ready to issue (e.g., by setting the particular bit to "1"). In various embodiments, instruction fetch and decode circuit 102, rename circuit 104, and dispatch circuit 106 may include any suitable combination of logic gates, latch circuits, register circuits, sequential logic circuits, and the like to perform as described herein.

In various embodiments, dispatch circuit 106 may be configured to route the ops, with their corresponding ready information, to various ones of instruction queues 108. In various embodiments, instruction queues 108 may be configured to store information indicative of one or more ops. For example, instruction queues 108 may be configured to store, for a given op, information indicative of that op (e.g., op code, operands to be utilized for the op, etc.) and ready information indicating whether the given op is ready to be issued to an execution circuit. As various previous ops are executed, the ready information of the ops in the instruction queues 108A-108N may be updated. For example, an op that generates a result on which another op in the instruction queue 108A-108N depends may update the ready information for that other op to indicate that the dependency is satisfied.

Processor 100 further includes selection circuit 110. In various embodiments, selection circuit 110 is configured to select ops from instruction queues 108 to issue to various execution circuits 114. For example, selection circuit 110, in various embodiments, may be configured to select ops to issue to various execution circuits 114 based on ready information generated by dispatch circuit 106 and updated in response to subsequent op execution. In various embodiments, individual instruction queues 108 may correspond to individual execution circuits 114 such that ops in a given instruction queue 108, such as instruction queue 108A, may be primarily issued to a given execution circuit 114, such as execution circuit 114A. Thus, in this example, instruction queue 108A may be said to correspond to execution circuit 114A. Note, however, that a correspondence between an instruction queue 108 and an execution circuit 114 does not mean that the ops from that instruction queue 108 are issued exclusively to its corresponding execution circuit 114. Instead, as described in more detail below and with reference to FIG. 2, selection circuit 110 may be configured to select ops from a particular instruction queue, such as instruction queue 108A, to be issued to an execution circuit 114 (e.g., execution circuit 114B) other than the execution circuit 114 corresponding to the particular instruction queue 108.

Processor 100 further includes register file circuit 112, which may be configured to store data for the ops selected by selection circuit 110 prior to performance by the selected execution circuits 114 (e.g., to prevent interference with ops previously-issued to execution circuits 114). Register file circuit 112 may include multiple registers, each of which may be configured to store multiple bits of data. In various embodiments, each data bit may be stored by a respective data storage circuit included in register file circuit 112. Such data storage circuits may include static random-access memory style storage cells, latches, or any other suitable data storage circuits. In some cases, the data storage circuits may include separate read and write ports. Note that, although only one register file circuit 112 is shown in processor 100 for clarity, any suitable number of register file circuits may be implemented without departing from the scope of this disclosure.

Processor 100 includes a plurality of execution circuits 114, which may be configured to "perform" various ops. The concept of "execution" is broad and may refer to 1) processing of an instruction throughout an execution pipeline (e.g., through fetch, decode, execute, and retire stages), and 2) processing of an instruction at an execution circuit of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Processor 100 further includes retire circuit 116, which may be configured to store the result of the op from the execution circuits 114 until it is determined that the result is ready to be stored in a register file (or any other suitable memory element). As used herein, the terms "complete" or "retire" in the context of an op refer to commitment of the op's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof. Alternatively, the register file circuit 112 may be a collection of physical registers assigned by the rename circuit 104, and retire circuit 116 may be responsible for communicating with the rename circuit to indicate which physical registers are committed to architected state and to redirect execution for exceptions, miss-speculation, etc.

Note that the configuration of processor 100 shown in FIG. 1 is provided merely as an example and is not intended to limit the scope of this disclosure. One of ordinary skill in the art with the benefit of this disclosure will recognize that other circuit blocks and/or other arrangements of circuit blocks are possible and contemplated. For example, many different pipeline architectures are possible with varying orderings of circuit elements/portions. Various pipeline stages perform such steps on an op during one or more processor clock cycles, then pass the op on to other stages for further processing.

The disclosed circuitry and methods may provide various improvements to the operation of processor 100, as well as improve the functioning of the system in which processor 100 operates as a whole. For example, consider an instance in which, for a given clock cycle, multiple ops in a particular instruction queue (e.g., instruction queue 108A) are ready to issue to an execution circuit 114, while none of the ops from another instruction queue (e.g., instruction queue 108B) are ready to issue. If selection circuit 110 were configured to route ready ops only from an instruction queue to its corresponding execution circuit, then execution circuit 114B would not receive, and therefore would not perform, an op during the given clock cycle, despite multiple ops being ready to be performed. Such an approach may unnecessarily limit the throughput of processor 100. Processor 100 could implement a unified selection circuit that may be configured to route any of a large number of ops to any execution circuit that is available. As noted above, however, such an approach may require a relatively-large number of logic gates to implement, adding time to the op selection process and using a greater amount of power.

According to various embodiments, however, the disclosed circuitry and methods may allow for the selection of ops in a manner that increases throughput of processor 100 while reducing chip area and power consumption relative to a unified selection circuit. For instance, in the above-described example in which multiple ops in instruction queue 108A are ready to issue but none of the ops in instruction queue 108B are ready, selection circuit 110 may be configured to select a first op from instruction queue 108A to issue to execution circuit 114A during the given clock cycle and, in response to a determination that no ops in instruction queue 108B are available to issue, select a second op from instruction queue 108A to issue to execution circuit 114B. As noted above, this selection of an op from one instruction queue 108 to issue to its non-corresponding execution circuit 114 may increase throughput of processor 100, improving the functioning of the system in which processor 100 operates.

Figure 2:
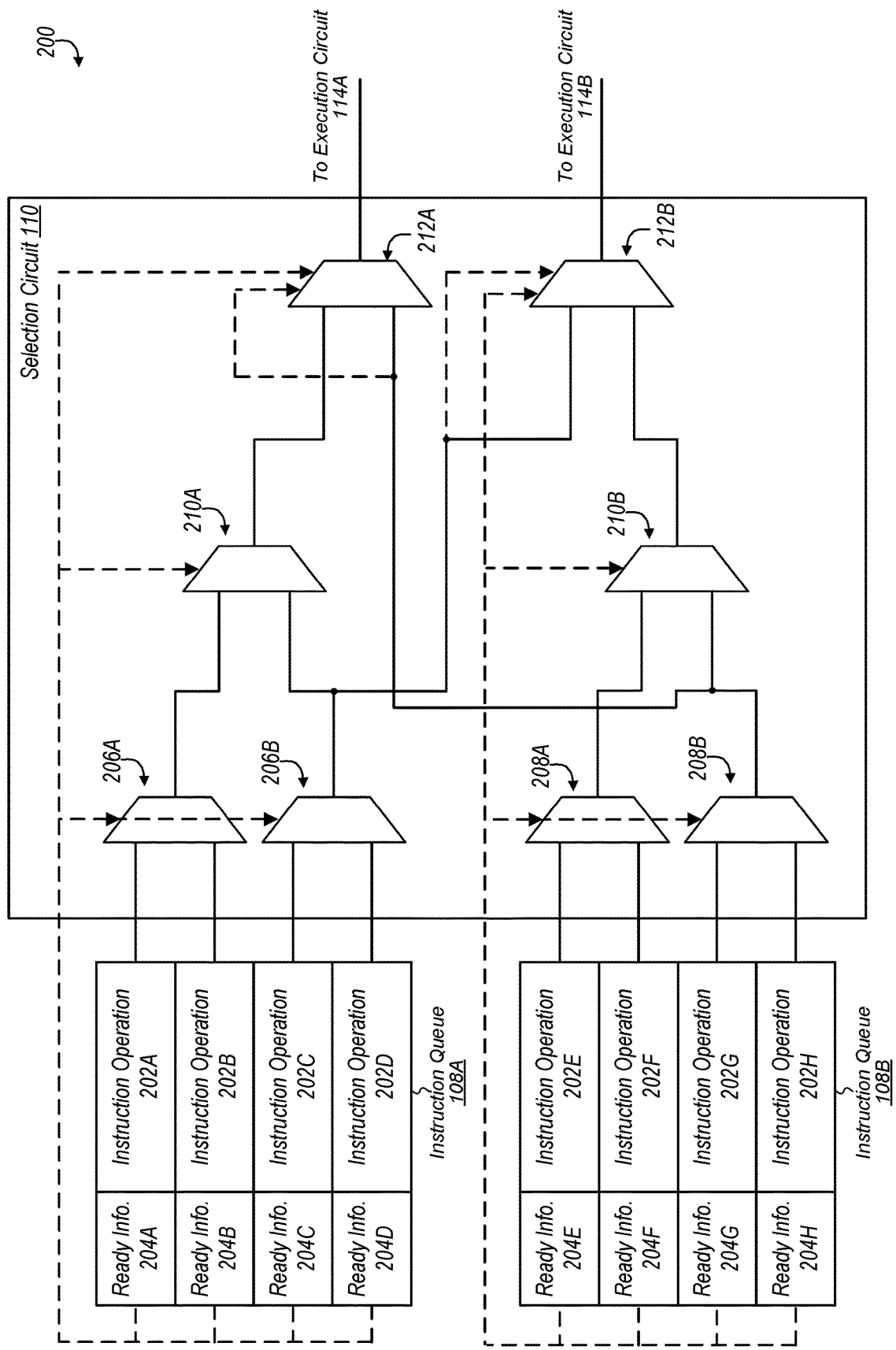
FIG. 2 is a block diagram illustrating example instruction queues and a selection circuit, according to some embodiments.

Turning now to FIG. 2, a block diagram 200 illustrating instruction queues 108A-108B and a portion of selection circuit 110 is shown, according to some embodiments. In the illustrated embodiment, selection circuit 110 is configured to select instruction operations 202 ("ops 202") from instruction queues 108A and 108B to issue to execution circuits 114A and 114B.

In various embodiments, instruction queues 108 may be configured to store information indicative of one or more ops prior to the ops being issued to one or more execution circuits 114. For example, as shown in FIG. 2, instruction queue 108A includes information indicative of ops 202A-202D and ready information 204A-204D corresponding to ops 202A-202D, respectively. Similarly, instruction queue 108B includes information indicative of ops 202E-202H and ready information 204E-204H corresponding to ops 202E-202H, respectively. As noted above, ready information 204 includes information indicative of whether a given op 202 is ready to be issued to an execution circuit 114, according to various embodiments. For example, ready information 204A may include one or more data bits indicative of whether op 202A is ready to be issued to an execution circuit 114.

Note that although instruction queues 108A and 108B are shown in FIG. 2 with only four entries each, this embodiment is provided merely as an example. In other embodiments, each instruction queue 108 may include any suitable number of entries for ops to be issued to one or more execution circuits 114. Further note that, in some embodiments, the four entries shown in each of instruction queues 108A and 108B may correspond to four entries in a selection window for instruction queues 108A and 108B, respectively. That is, a given instruction queue 108 may have any suitable number of entries to store information indicative of ops, and selection circuit 110 may be configured to select ops to issue from a particular "window" or subset of ops in the given instruction queue 108. The order in which ops 202 are stored in instruction queues 108 may vary, according to various embodiments. For example, in some embodiments, ops 202 are stored in instruction queues 108 based on their "age," with ops 202 positioned earlier in a sequence of ops placed higher in the instruction queue 108 than ops 202 positioned later in the sequence of ops. Thus, with reference to instruction queue 108A, op 202A may be "older" op 202B, which may be older than op 202C, etc., in such embodiments. Note, however, that this embodiment is merely provided as an example and ops 202 may be stored in instruction queues 108 according to any suitable ordering.

In the embodiment shown in FIG. 2, instruction queue 108A corresponds to execution circuit 114A (shown in FIG. 1) and instruction queue 108B corresponds to execution circuit 114B (shown in FIG. 1). In various embodiments, selection circuit 110 is configured to select ops 202 from instruction queue 108A and issue the selected ops 202 (via register file circuit 112) to execution circuit 114A. Further, in various embodiments, selection circuit 110 is configured to select ops 202 from instruction queue 108B and issue the selected ops 202 (via register file circuit 112) to execution circuit 114B. As noted above, however, in various embodiments, selection circuit 110 may be configured to select a first op 202 from a first instruction queue 108 to issue to a first execution circuit 114 and a second op 202 from the first instruction queue 108 to issue to a second execution circuit 114. In some instances, for example, multiple ops 202 in one instruction queue 108 may be ready to issue while none of the ops 202 in another instruction queue 108 are ready to issue.

For example, instruction queue 108A may have two ops 202 ready to issue during a given clock cycle, while instruction queue 108B has no ops 202 that are ready to issue during that same clock cycle. In such embodiments, selection circuit 110 may be configured to select a first op 202 from instruction queue 108A to issue to execution circuit 114A during the given clock cycle and, in response to a determination that no ops 202 in instruction queue 108B are available to issue, select a second op 202 from instruction queue 108A to issue to execution circuit 114B. As noted above, this selection of an op 202 from one instruction queue 108 to issue to its non-corresponding execution circuit 114 may increase throughput of processor 100 in an embodiment.

As shown in FIG. 2, selection circuit 110 includes a plurality of multiplexer circuits 206-212. A multiplexing circuit (also referred to as a "multiplexor" or "mux") refers to a circuit configured to select one or more output signals from two or more input signals based on one or more control signals. In various embodiments, ready information may be used to generate various control signals used to perform the selection of ops as described herein. As will be appreciated by one of ordinary skill in the art with the benefit of this disclosure, such control signals may be generated using any suitable combination of logic gates, sequential logic circuits, and the like configured to generate one or more control signals that may be used to control various ones multiplexing circuits 206-212. For example, selection circuit 110 may include one or more logic circuits (not shown) configured to use ready information 204 to generate the control signals used by multiplexing circuits 206-212 to select ops to issue to execution circuits 114A and 114B. In one embodiment, for example each mux 206A-206B, 208A-208B, and 210A-210B may select the oldest ready op from among the ops input to that mux 206A-206B, 208A-208B, and 210A-210B. Thus, the muxes 210A-210B may select the oldest op from among the ops selected by muxes 206A-206B and 208A-208B, respectively, in this embodiment. Muxes 212A-212B may select the output of mux 210A-210B, respectively, if a ready op is provided by the mux 210A-210B. If the op is not ready, and the op from a predesignated non-overlapping subset of ops from the opposite instruction queue 108A-108B is ready and not issued to the primary execution circuit 114A-114B, respectively, then that op may be selected. More specifically, if the output of mux 210A is not a ready op, and the output of muxes 208A-208B are both ready ops, the output of mux 208A may be selected by the mux 212B and issued to the execution circuit 114B and the output of mux 208B may be selected by the mux 212A and issued to the issue circuit 212A. On the other hand, if the output of mux 208A is not a ready op, the output of the mux 208B (if a ready op) may be selected by the muxes 210B and 212B to issue to the execution circuit 114B and no op may be issued to the execution circuit 114A if there are no ready ops in the instruction queue 108A. Similar operation occurs with regard to muxes 206A-206B, 210A, and 212B.

In FIG. 2, each of multiplexing circuits 206-212 is shown as a 2×1 multiplexing circuit. Note, however, that this embodiment is provided merely as an example and is not intended to limit the scope of this disclosure. One of ordinary skill in the art with the benefit of this disclosure will recognize that multiplexing circuits with any suitable input and output configurations may be used, in various embodiment. Further note that, although multiplexing circuits 206-212 are shown in FIG. 2, any suitable circuit element configured to select one or more output signals from two or more input signals may be used, according to various embodiments.

In various embodiments, selection circuit 110 may be configured to select a first plurality of ops from instruction queue 108A using ready information 204A-204D for ops 202A-202D. For example, multiplexing circuit 206A may be configured to select one of ops 202A-202B based on respective ready information 204A-204B. Similarly, multiplexing circuit 206B may be configured to select one of ops 202C-202D based on respective ready information 204C-204D. Note that, as shown in FIG. 2, multiplexing circuits 206A and 206B are configured to select the plurality of ops from non-overlapping subsets of two or more ops in instruction queue 108A. In an embodiment in which instruction queue 108A includes more than four entries in its selection window (e.g., eight), multiplexing circuits 206A-206B may similarly be configured to select a first plurality of ops from non-overlapping subsets of entries in instruction queue 108A, with a greater number of ops in each of the non-overlapping subsets (e.g., four entries in each). Alternatively, a larger number of multiplexors 206A-206B may be used.

Further, selection circuit 110 may be configured to select, from the first plurality of ops, a first op to issue to execution circuit 114A, according to some embodiments. In the illustrated embodiment, multiplexing circuit 210A may be configured to select a first op from the output of multiplexing circuits 206A and 206B based on ready information 204. For example, in some embodiments, multiplexing circuit 210A may be configured to select an oldest op (e.g., the output of multiplexing circuit 206A) from the first plurality of ops. Further, as described in more detail below with reference to FIG. 3, selection circuit 110 may be configured to select a second op 202 from the first plurality of ops to issue to execution circuit 114B in response to a determination that no ops in instruction queue 108B are available to issue. For example, in some embodiments, selection circuit 110 may be configured to select a youngest op from the first plurality of ops (e.g., the output of multiplexing circuit 206B) to issue to execution circuit 114B. Note, however, that this embodiment is provided merely as an example and is not intended to limit the scope of this disclosure. One of ordinary skill in the art with the benefit of this disclosure will recognize that the op selected for execution circuit 114A may be an op other than the oldest ready op in instruction queue 108A, and that the op routed to execution circuit 114B may be an op other than the youngest op from the first plurality of ops or from instruction queue 108A, according to various embodiments. For example, the op routed to execution circuit 114B in FIG. 2 is not necessarily the youngest ready op in instruction queue 108A, in various embodiment. Consider an instance in which ops 202A, 202C, and 202D are available for issue during a given clock cycle, while ops 202B and 202E-202H are not available for issue during the given clock cycle. In such an embodiment, multiplexing circuits 206A may be configured to select op 202A as its output, as op 202B is not currently ready to issue. Further, in this example, multiplexing circuit 206B may be configured to select op 202C as its output, as it is older than op 202D. Accordingly, multiplexing circuit 210A may have as its input ops 202A and 202C, from which it may select op 202A to issue to execution circuit 114A since it is the oldest op. Mux 212A may also select op 202A. Additionally, since ops 202E-202H are not ready, mux 212B may select op 202C to issue to execution circuit 114B. Thus, in this example, the op (e.g., op 202C) issued to execution circuit 114B is not the youngest ready op (e.g., op 202D) in instruction queue 108A.

In the embodiment of FIG. 2, the selection window for each of instruction queues 108A and 108B includes only four entries and, accordingly, the op selected from a first instruction queue (e.g., instruction queue 108A) to issue to a second execution circuit (e.g., execution circuit 114B) is more likely to be a youngest op from the first instruction queue. Note, however, that in various embodiments, selection circuit 110 may be configured to select an op of intermediate age from a first instruction queue (e.g., instruction queue 108A) to issue to a second execution circuit (e.g., execution circuit 114B). For example, in an embodiment in which the selection window for instruction queues 108A and 108B is larger (e.g., eight entries), selection circuit 110 may include additional multiplexing circuits configured to select ops from the eight entries for each queue 108. In this embodiment, the op selected from instruction queue 108A to issue to execution circuit 114B may be one of intermediate age relative to other ops in instruction queue 108A.

As shown in FIG. 2, the output of multiplexing circuit 206B is connected to the input of both multiplexing circuits 210A and 212B. If no ops 202 from instruction queue 108B are available for issue, multiplexing circuit 212B may be configured to select, based on one or more control signals, the output of multiplexing circuit 206B to issue to execution circuit 114B, according to some embodiments. As discussed in more detail below, the one or more control signals used to control multiplexing circuit 212B may, in some embodiments, be generated based on ready information for ops in instruction queue 108B, and the output of multiplexing circuit 206B (op 202D, in this embodiment), as shown in FIG. 2. Similarly, in some embodiments, the one or more control signals used to control multiplexing circuit 212A may be generated based on ready information for ops in instruction queue 108A, and the output of multiplexing circuit 208B, as shown in FIG. 2.

Note that, although FIG. 2 has been described in reference to selecting multiple ops from instruction queue 108A to issue to execution circuits 114A and 114B, the disclosed systems and techniques are not limited to this embodiment. For example, in instances in which multiple ops 202 in instruction queue 108B are available to issue while none of the ops 202 in instruction queue 108A are available for issue, selection circuit 110 may be similarly configured to select a first op 202 from instruction queue 108B to issue to execution circuit 114B and select a second op 202 from instruction queue 108B to issue to execution circuit 114A.

Further note that, although selection circuit 110 has been described with reference to two instruction queues 108 and two execution circuits 114, this embodiment is provided for clarity and is not intended to limit the scope of this disclosure. In other embodiments, selection circuit 110 may be configured to perform similar selection operations as described herein with three or more instruction queues 108 and/or three or more execution circuits 114.

Figure 3:
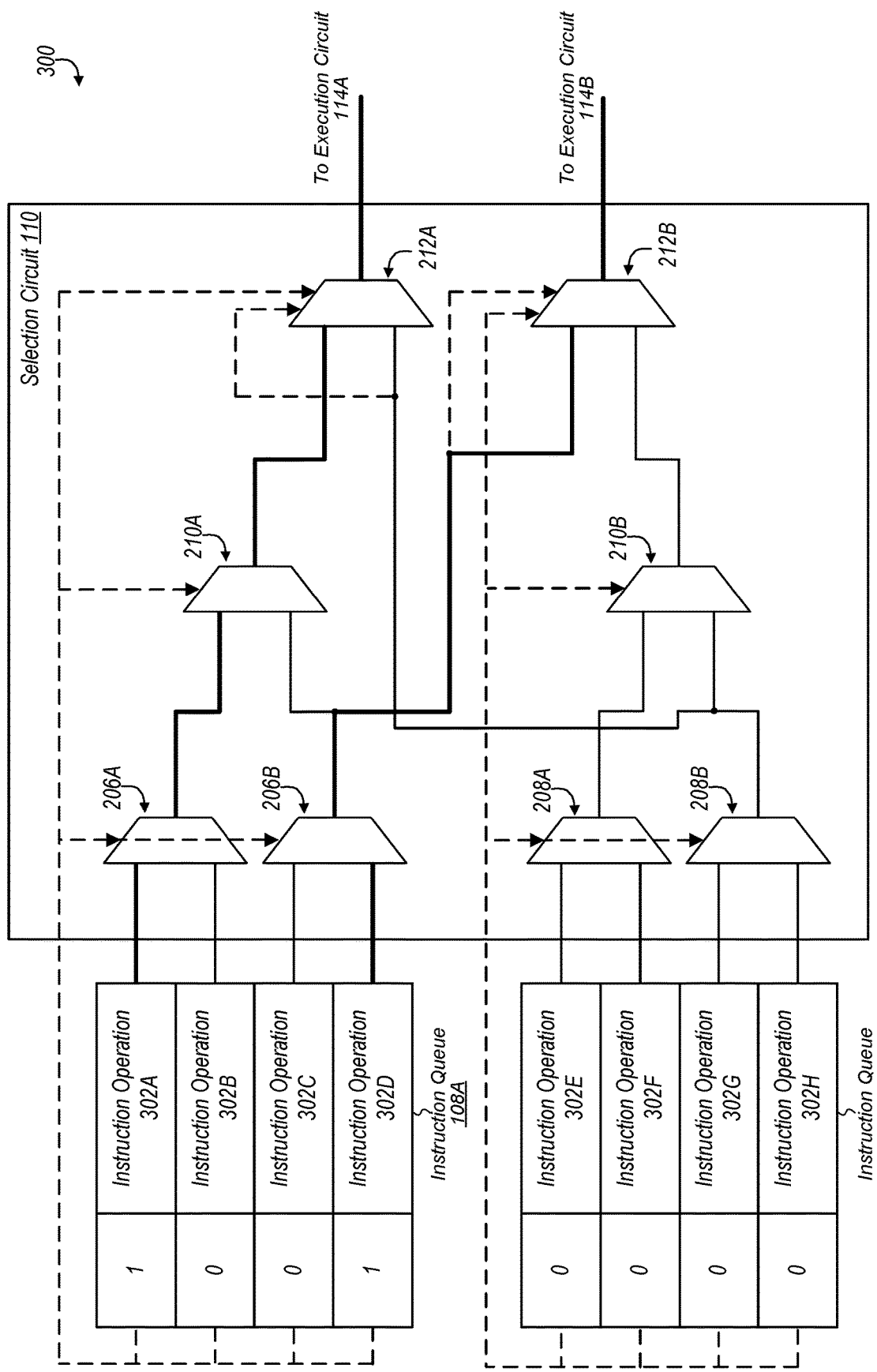
FIGS. 3 and 4 are block diagrams illustrating the selection of instruction operations to issue to execution circuits, according to some embodiments.

Referring now to FIG. 3, a block diagram 300 is shown illustrating the selection of ops to issue to execution circuits 114A and 114B, according to one embodiment. More specifically, block diagram 300 depicts an embodiment in which two ops 302 are selected from instruction queue 108A to issue to execution circuits 114A and 114B during a given clock cycle.

In the depicted embodiment, instruction queues 108A and 108B store information indicative of ops 302A-302D and 302E-302H, respectively. Further, instruction queues 108A and 108B also include ready information for each of ops 302. In the illustrated embodiment, ready information 204 of FIG. 2 has been replaced with a single data bit. In this embodiment, a value of "1" indicates that a respective op is ready to be issued, while a value of "0" indicates that a respective op is not yet ready to be issued. Note, however, that this embodiment is provided merely as an example and any suitable encoding methodology may be used, in various embodiments. Further, in various embodiments, ready information may include any suitable number of data bits to represent whether a given instruction operation is ready to be issued.

As shown in FIG. 3, two ops in instruction queue 108A (ops 302A and 302D) are available to issue, as indicated by the corresponding ready information. Further, as shown in FIG. 3, none of the ops 302E-302H in instruction queue 108B are ready for execution, as indicated by the corresponding ready information. In the embodiment of FIG. 3, selection circuit 110 is configured to select op 302A to issue to execution circuit 114A and to select op 302D from instruction queue 108A to issue to execution circuit 114B.

For example, multiplexing circuit 206A may be configured to select op 302A based on the ready information for ops 302A-302B. Similarly, multiplexing circuit 206B may be configured to select op 302D based on the ready information for ops 302C-302D. Thus, in this embodiment, the input signals to multiplexing circuit 210A are ops 302A and 302D. From these input signals, multiplexing circuit 210A may be configured to select op 302A based on ready information for the respective signals.

As noted above, the output of multiplexing circuit 206B is connected to the input of both multiplexing circuits 210A and 212B. In an embodiment in which the output from multiplexing circuit 206B is not selected by multiplexing circuit 210A and in which no ops 302 are available for issue from instruction queue 108B, multiplexing circuit 212B may be configured to select the output of multiplexing circuit 206B to issue to execution circuit 114B. For example, in the embodiment of FIG. 3, multiplexing circuit 212B may select op 302D to issue to execution circuit 114B. In this way, selection circuit 110 is configured to issue two ops from instruction queue 108A to different execution circuits 114 for execution during a given clock cycle.

Note that, in some embodiments, execution circuit 114B may be unable to perform one or more given ops that are in instruction queue 108A and, accordingly, selection circuit 110 may be configured to prevent those ops from being issued to execution circuit 114B in such instances. In the embodiment presented in FIG. 3, for example, consider an instance in which both ops 302A and 302D are available to issue from instruction queue 108A and none of the ops 302E-302H are available to issue from instruction queue 108B, as shown. In such an instance, multiplexing circuits 206A, 210A, and 212A may be configured to select op 302A to issue to execution circuit 114A during a given clock cycle. In this example, however, assume that execution circuit 114B is unable to perform op 302D, for example due to a static constraint (e.g., execution circuit 114B lacks the necessary hardware to perform op 302D) or a dynamic constraint (e.g., execution circuit 114B includes the necessary hardware to perform op 302D, but is unable to perform op 302D during the given clock cycle). Thus, even though op 302D is ready to issue, in such an instance, selection circuit 110 may be configured to block op 302D from issuing to execution circuit 114B. For example, as shown in FIG. 3, the output of multiplexing circuit 206B is used to generate a control signal for multiplexing circuit 212B. In such embodiments, selection circuit 110 (and, particularly, multiplexing circuit 212B) may be configured to prevent the op from instruction queue 108A (op 302D, in this instance) from being issued to execution circuit 114B based on the control signal from multiplexing circuit 206B. Instead, op 302D would be delayed and issued to execution circuit 114A in a subsequent clock cycle. Further, multiplexing circuit 212A may be similarly configured to prevent an op from instruction queue 108B from being issued to execution circuit 114A based on a control signal from multiplexing circuit 208B in similar instances.

Figure 4:
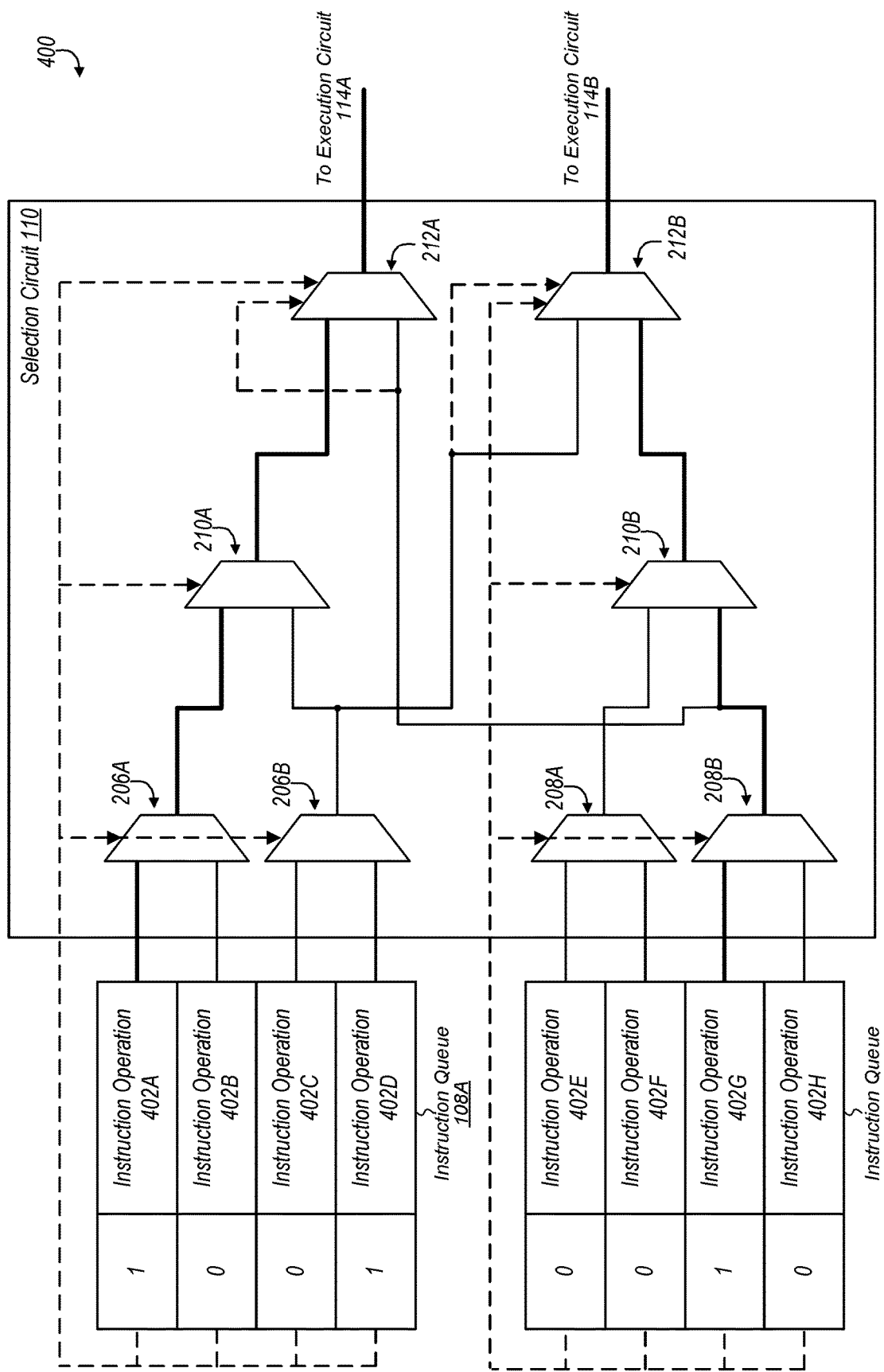

Turning now to FIG. 4, a block diagram 400 is shown illustrating the selection of instruction operations to issue to execution circuits 114A and 114B, according to one embodiment. More specifically, block diagram 400 depicts an embodiment in which one op 402A is selected from instruction queue 108A to issue to execution circuit 114A and one op 402G is selected from instruction queue 108B to issue to execution circuit 114B, during a given clock cycle.

In the depicted embodiment, instruction queues 108A and 108B store information indicative of ops 402A-402D and 402E-402H, respectively. Further, instruction queues 108A and 108B also include ready information for each of ops 402A-402D and 402E-402H, respectively. As in FIG. 3, the embodiment of FIG. 4 shows that two ops in instruction queue 108A (ops 402A and 402D) are available to issue, as indicated by the corresponding ready information. In contrast to FIG. 3, however, the embodiment of FIG. 4 shows that one op (op 402G) in instruction queue 108B is ready to issue, as indicated by its corresponding ready information. In the embodiment of FIG. 4, selection circuit 110 is configured to select op 402A, from instruction queue 108A, to issue to execution circuit 114A, and to select op 402G, from instruction queue 108B, to issue to execution circuit 114B.

For example, multiplexing circuit 206A may be configured to select op 402A based on the ready information for ops 402A-402B. Similarly, multiplexing circuit 206B may be configured to select op 402D based on the ready information for ops 402C-402D. Thus, as in the example of FIG. 3, the input signals to multiplexing circuit 210A are ops 302A and 302D in this embodiment. From these input signals, multiplexing circuit 210A may be configured to select op 302A based on ready information for the respective signals. That is, in some embodiments, selection circuit 110 may be configured to select the oldest available op to issue to an execution circuit 114. Further, in some embodiments, ops 402 may be ordered in instruction queue 108 based on age, such that an op at the output of multiplexing circuit 206A is older than an op at the output of multiplexing circuit 206B. In such embodiments, multiplexing circuit 210A may be configured to select (e.g., based on a control signal generated using ready information for ops in instruction queue 108A) op 402A as the oldest available op from instruction queue 108A.

With reference to instruction queue 108B, multiplexing circuits 208B and 210B may be configured to select op 402G based on the ready information for ops 402E-402H, in the depicted embodiment. Thus, in this embodiment, the input signals to multiplexing circuit 212B are ops 402D and 402G. From these input signals, multiplexing circuit 212B may be configured to select, based on one or more control signals, op 402G, rather than op 402D, to issue to execution circuit 114B. In some embodiments, the one or more control signals used to control multiplexing circuit 212B may be generated based on ready information for ops in instruction queue 108B, and the output of multiplexing circuit 206B (op 202D, in this embodiment), as shown in FIG. 4. In such an embodiment, op 402D may be delayed and issued to execution circuit 114A in the subsequent clock cycle (e.g., to prioritize issuing ops from an instruction queue 108 to corresponding execution circuit 114 when such ops are available to issue).

Example Methods

Figure 5:
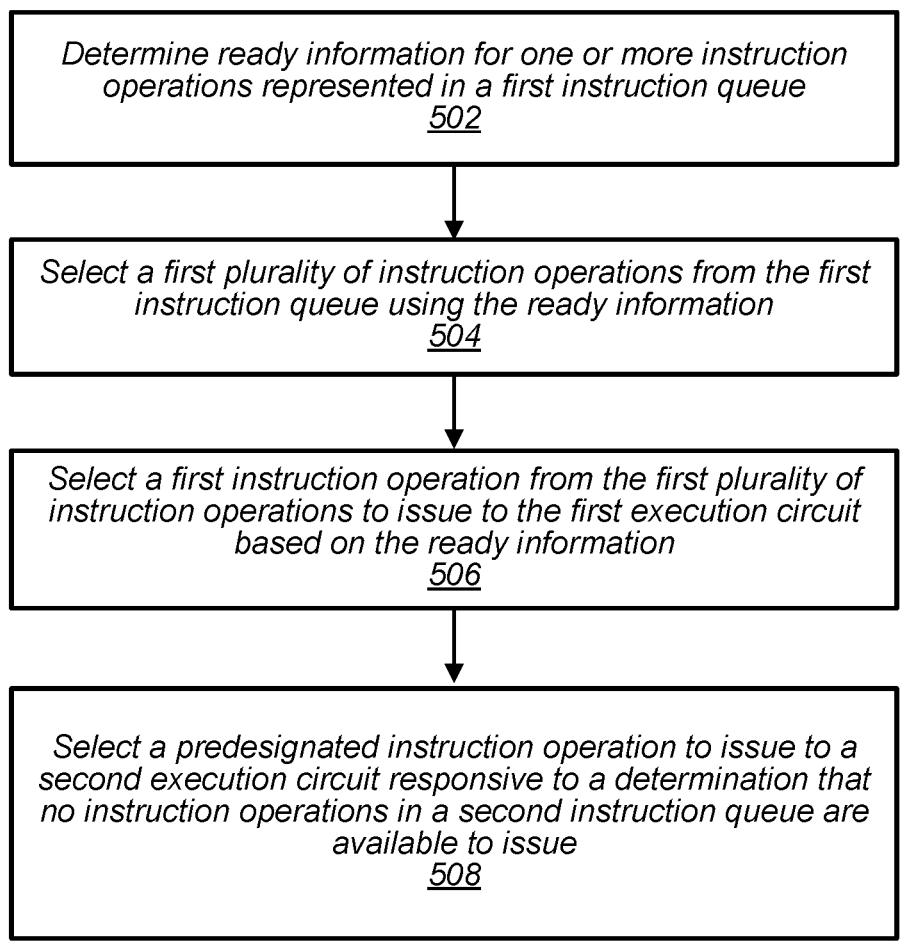
FIGS. 5 and 6 are flow diagrams illustrating example methods for selecting instruction operations to issue, according to some embodiments.

Turning now to FIG. 5, a flow diagram of an example method 500 for selecting instruction operations in a pipelined processor is shown, according to some embodiments. In various embodiments, method 500 may be implemented, for example, by dispatch circuit 106 and selection circuit 110 of FIG. 1. FIG. 5 includes elements 502-508. While these elements are shown in a particular order for ease of understanding, other orders may be used. In various embodiments, some of the method elements may be performed concurrently, in a different order than shown, or may be omitted. Additional method elements may also be performed as desired.

Element 502 includes determining ready information for one or more ops represented in a first instruction queue. For example, dispatch circuit 106 may determine ready information for one or more ops in instruction queue 108A, where instruction queue 108A corresponds to execution circuit 114A, according to some embodiments. Logic associated with the instruction queues 108A-108N may also update the ready information as previous ops execute.

Method 500 then proceeds to element 504, which includes selecting a first plurality of ops from the first instruction queue using the ready information. For example, with reference to FIG. 3, selection circuit 110 may select ops 302A and 302D from instruction queue 108A based on the ready information for ops 302A-302D. In some embodiments, each op of the first plurality of ops is selected from a respective non-overlapping subset of two or more ops in the first queue. For example, as shown in FIG. 3, op 302A is selected from the subset of ops that includes ops 302A-302B, and op 302D is selected from the subset of ops that includes ops 302C-302D. Thus, each of ops 302A and 302D are selected from a respective non-overlapping subset of ops in instruction queue 108A.

Method 500 then proceeds to element 506, which includes selecting a first op from the first plurality of ops to issue to the first execution circuit based on the ready information. For example, in FIG. 3, selection circuit 110 may select (e.g., via multiplexing circuits 210A and 212A) op 302A to issue to execution circuit 114A.

Method 500 then proceeds to element 508, which includes selecting a predesignated op to issue to a second execution circuit responsive to a determination that no ops in a second instruction queue are available to issue. For example, in FIG. 3, the output of multiplexing circuit 206B is connected as an input to both multiplexing circuits 210A and 212B and, therefore, an op that is selected by multiplexing circuit 206B may be considered a "predesignated" op in that it may be selected to issue to execution circuit 114B. As shown in FIG. 3, selection circuit 110 includes multiplexing circuit 212B that is configured to select, based on one or more control signals, between this predesignated op from instruction queue 108A and one or more ops from instruction queue 108B. Thus, in the embodiment depicted in FIG. 3, op 302D may be considered a predesignated op that is selected to issue to execution circuit 114B. In some embodiments, the one or more control signals used by multiplexing circuit 212B may include the predesignated op (e.g., op 302D) and ready information for one or more ops in instruction queue 108B.

In some embodiments, the predesignated op (such as op 302D, for example) may be selected to issue to execution circuit 114B in response to both a determination that no ops in instruction queue 108B are available to issue, and the predesignated op not being selected to issue to execution circuit 114A. For example, if, in FIG. 3, the only op available to issue during a given clock cycle were op 302D, then this op could be considered a predesignated op in that it could be selected to issue to either execution circuit 114A or 114B. In such an example, however, op 302D would be selected to issue to execution circuit 114A, as there are no other ops available to issue from instruction queue 108A during that clock cycle and, therefore, no need to route op 302D to execution circuit 114B.

In various embodiments, method 500 may further include selecting an op from instruction queue 108B to issue to execution circuit 114A in response to a determination that no ops are available to issue from instruction queue 108A. For example, in some embodiments, method 500 further includes selecting a second plurality of ops from a second instruction queue (e.g., instruction queue 108B) using second ready information for ops represented in the second instruction queue. In some embodiments, each op of the second plurality may be selected from a respective non-overlapping subset of two or more ops in the second instruction queue. Further, in some embodiments, method 500 includes selecting a third op from the second plurality of ops to issue to the second execution circuit (e.g., execution circuit 114B). In some such embodiments, selecting the third op to issue to the second execution circuit may include selecting an oldest op from the second plurality of ops.

Further, in some embodiments, method 500 may further include selecting a second predesignated op of the second plurality of ops to issue to the first execution circuit (e.g., execution circuit 114A) in response to a determination that no ops in the first instruction queue (e.g., instruction queue 108A) are available to issue, and based on the second predesignated op being different from the third op. In some such embodiments, selecting the second predesignated op to issue to the first execution circuit includes selecting a youngest op from the second plurality of ops. As shown in FIG. 3, the output of multiplexing circuit 208B is connected as an input to both multiplexing circuits 210B and 212A and, therefore, an op that is selected by multiplexing circuit 208B may be considered a "predesignated" op in that it may be selected to issue to execution circuit 114A. In FIG. 3, selection circuit 110 includes multiplexing circuit 212A that is configured to select, based on one or more control signals, between this second predesignated op from instruction queue 108B and one or more ops from instruction queue 108A. In some embodiments, the one or more control signals used by multiplexing circuit 212A may include the predesignated op and ready information for one or more ops in instruction queue 108A.

Figure 6:
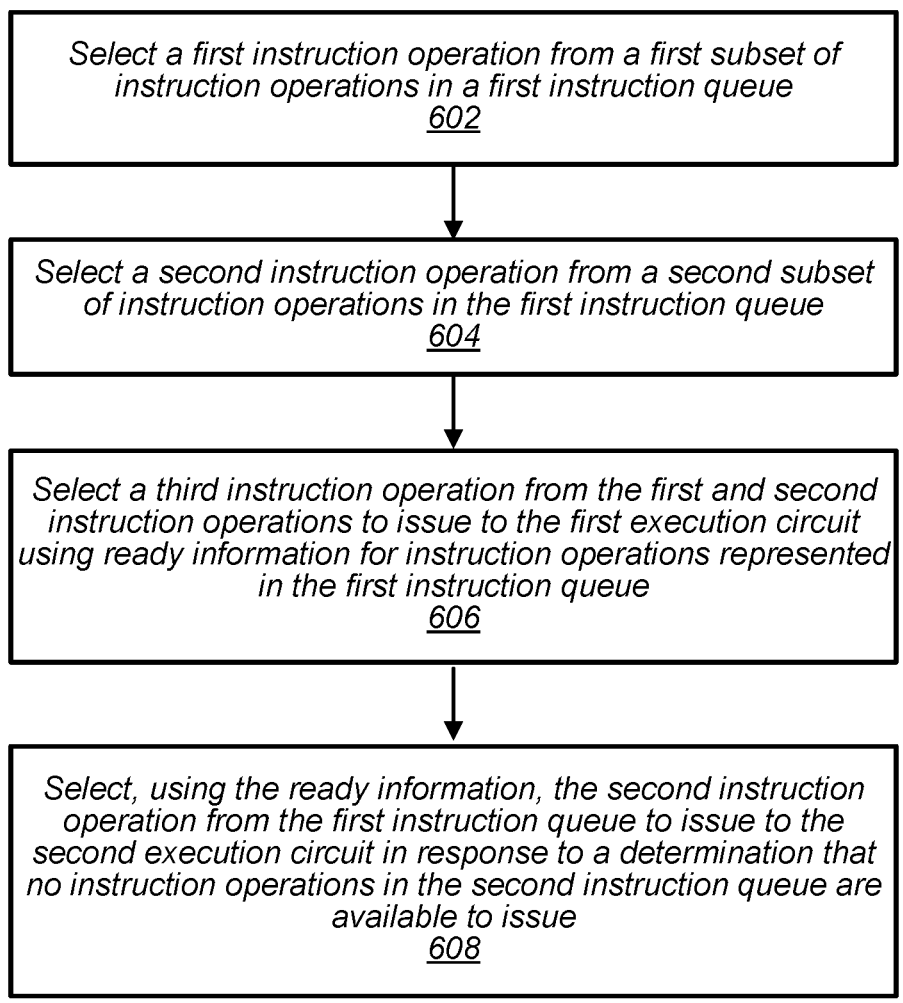

Turning now to FIG. 6, a flow diagram of an example method 600 for selecting instruction operations in a pipelined processor is shown, according to some embodiments. In various embodiments, method 600 may be implemented, for example, by selection circuit 110 of FIG. 1. FIG. 6 includes elements 602-608. While these elements are shown in a particular order for ease of understanding, other orders may be used. In various embodiments, some of the method elements may be performed concurrently, in a different order than shown, or may be omitted. Additional method elements may also be performed as desired.

Element 602 includes selecting a first op from a first subset of ops in a first instruction queue. For example, as shown in FIG. 3, multiplexing circuit 206A may be configured to select op 302A from a first subset of ops (e.g., ops 302A-302B) in instruction queue 108A.

Method 600 then proceeds to element 604, which includes selecting a second op from a second subset of ops in the first instruction queue. For example, multiplexing circuit 206B may be configured to select op 302D from a second subset of ops (e.g., ops 302C-302D) in instruction queue 108.

Method 600 then proceeds to element 606, which includes selecting a third op, from the first and second ops, to issue to the first execution circuit using ready information for ops represented in the first instruction queue. For example, multiplexing circuit 210A may be configured to select, based on one or more control signals, op 302A from ops 302A and 302D to issue to execution circuit 114A. In some embodiments, the one or more control signals may be based on ready information for one or more ops 302A-302D in instruction queue 108A. Further, in some embodiments, selecting the third op to issue to the first execution circuit may include selecting an oldest op from the first and second ops.

Method 600 then proceeds to element 608, which includes selecting, using the ready information, the second op from the first instruction queue to issue to the second execution circuit in response to a determination that no ops in the second instruction queue are available to issue. Further, in some embodiments, selecting the second op may be performed in response to the first op being selected as the third op, where the second op is predesignated for issue to the second execution circuit in the case that no op is available to issue from the second instruction queue. For example, multiplexing circuit 212B may be configured to select op 302D to issue to execution circuit 114B based on a control signal generated using the ready information for one or more of ops 302E-302F. Further, in some embodiments, selecting the second op to issue to the second execution circuit may include selecting a youngest op from the first and second ops.

In various embodiments, method 600 may further include selecting an op from instruction queue 108B to issue to execution circuit 114A in response to a determination that no ops are available to issue from instruction queue 108A. For example, in some embodiments, method 600 further includes selecting a fourth instruction operation from a first subset of ops in the second queue (e.g., instruction queue 108B). Method 600 may further include selecting a fifth op from a second subset of ops in the second instruction queue, where the second subset of ops in the second instruction queue is non-overlapping with the first subset of ops in the second instruction queue.

Further, in some embodiments, method 600 includes selecting a sixth op from the fourth and fifth instruction operations to issue to the second execution circuit (e.g., execution circuit 114B) using second ready information for ops represented in the second instruction queue. In some embodiments, for example, selecting the sixth op includes selecting an oldest op from the fourth and fifth ops.

In some embodiments, method 600 further includes selecting, using the second ready information, the fifth instruction operation to issue to the first execution circuit (e.g., execution circuit 114A) in response to a determination that no ops in the first instruction queue (e.g., instruction queue 108A) are available to issue, and further in response to the fourth op being selected as the sixth op. In some embodiments, the fifth op is predesignated to issue to the first execution circuit in the case that no op is available to issue from the first instruction queue. Further, in some embodiments, selecting the fifth op includes selecting a youngest op from the fourth and fifth ops in the second instruction queue.

Example Computing Device

Figure 7:
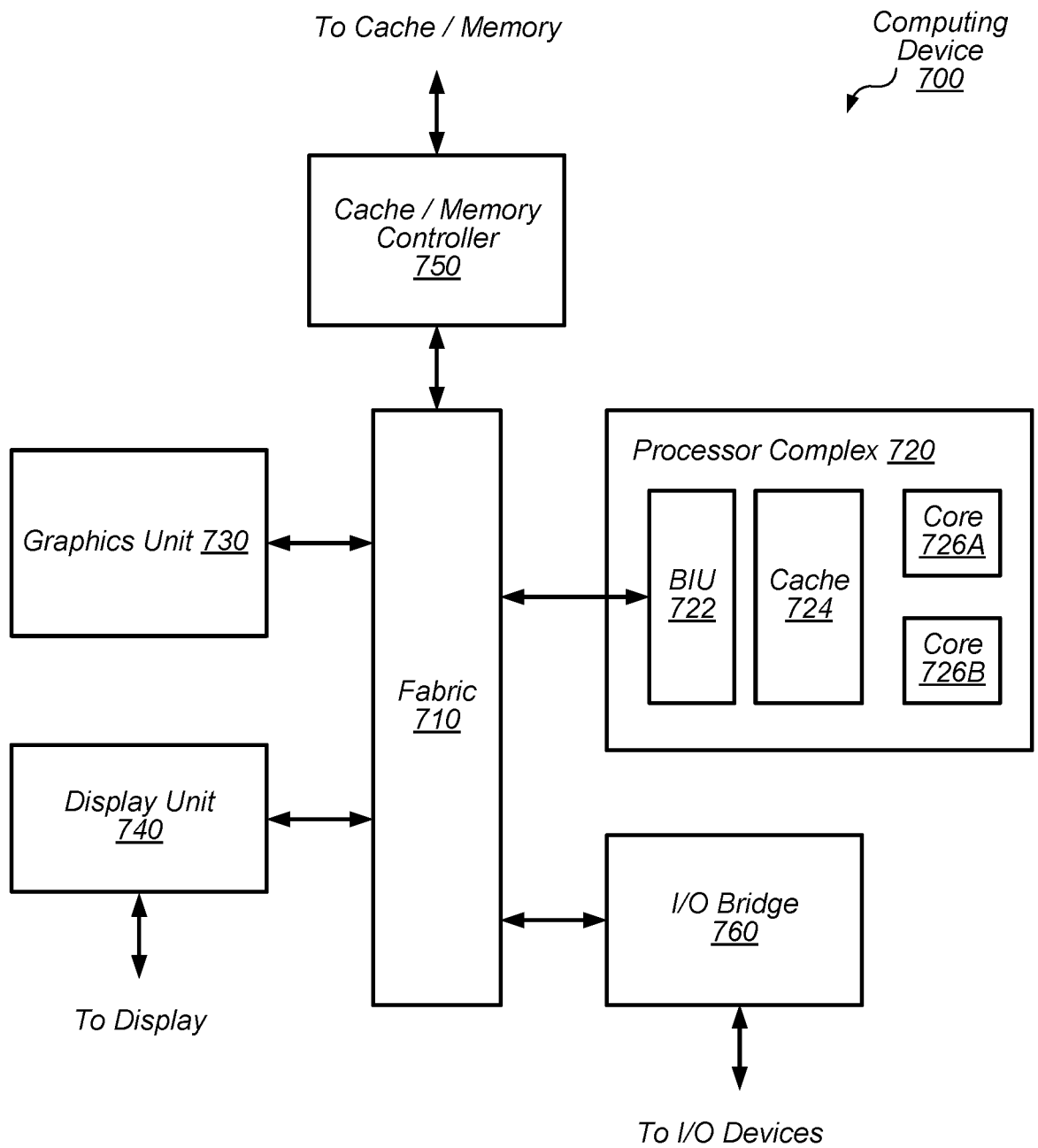
FIG. 7 is a block diagram illustrating an example computing device, according to some embodiments.

Turning now to FIG. 7, a block diagram illustrating an example embodiment of a device 700 is shown. In some embodiments, elements of device 700 may be included within a system on a chip (SOC). In some embodiments, device 700 may be included in a mobile device, which may be battery-powered. Therefore, power consumption by device 700 may be an important design consideration. In the illustrated embodiment, device 700 includes fabric 710, processor complex 720, graphics unit 730, display unit 740, cache/memory controller 750, input/output (I/O) bridge 760.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, graphics unit 730 may be described as "coupled to" a memory through fabric 710 and cache/memory controller 750. In contrast, in the illustrated embodiment of FIG. 7, graphics unit 730 is "directly coupled" to fabric 710 because there are no intervening elements.

In the illustrated embodiment, processor complex 720 includes bus interface unit (BIU) 722, cache 724, and cores 726A and 726B. In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches. In some embodiments, a coherency unit (not shown) in fabric 710, cache 724, or elsewhere in device 700 may be configured to maintain coherency between various caches of device 700. BIU 722 may be configured to manage communication between processor complex 720 and other elements of device 700. Processor cores such as cores 726 may be configured to execute instructions of a particular instruction set architecture (ISA), which may include operating system instructions and user application instructions. These instructions may be stored in computer readable medium such as a memory coupled to memory controller 750 discussed below.

Graphics unit 730 may include one or more processors and/or one or more graphics processing units (GPU's). Graphics unit 730 may receive graphics-oriented instructions, such as OPENGL®, Metal, or DIRECT3D® instructions, for example. Graphics unit 730 may execute specialized GPU instructions or perform other operations based on the received graphics-oriented instructions. Graphics unit 730 may generally be configured to process large blocks of data in parallel and may build images in a frame buffer for output to a display. Graphics unit 730 may include transform, lighting, triangle, and/or rendering engines in one or more graphics processing pipelines. Graphics unit 730 may output pixel information for display images.

Display unit 740 may be configured to read data from a frame buffer and provide a stream of pixel values for display. Display unit 740 may be configured as a display pipeline in some embodiments. Additionally, display unit 740 may be configured to blend multiple frames to produce an output frame. Further, display unit 740 may include one or more interfaces (e.g., MIPI® or embedded display port (eDP)) for coupling to a user display (e.g., a touchscreen or an external display).

Cache/memory controller 750 may be configured to manage transfer of data between fabric 710 and one or more caches and/or memories. For example, cache/memory controller 750 may be coupled to an L3 cache, which may in turn be coupled to a system memory. In other embodiments, cache/memory controller 750 may be directly coupled to a memory. In some embodiments, cache/memory controller 750 may include one or more internal caches. Memory coupled to controller 750 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 750 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause device 700 to perform functionality described herein.

I/O bridge 760 may include various elements configured to implement universal serial bus (USB) communications, security, audio, and/or low-power always-on functionality, for example. I/O bridge 760 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 760. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
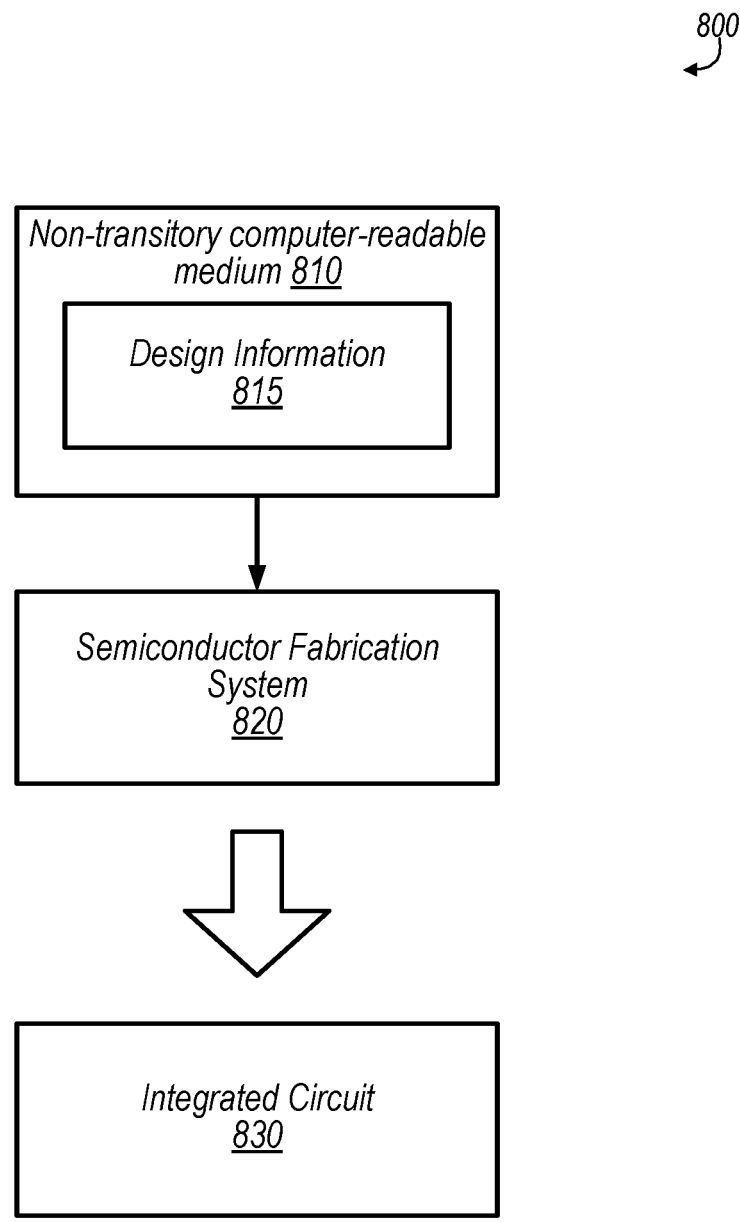
FIG. 8 is a block diagram illustrating an example computer-readable medium, according to some embodiments.

FIG. 8 is a block diagram 800 illustrating an example non-transitory computer-readable storage medium 810 that stores circuit design information 815, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable medium 810 may comprise any of various appropriate types of memory devices or storage devices. Medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 810 may include other types of non-transitory memory as well or combinations thereof. Medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," "third," etc. are used as labels for nouns that they precede, and do not imply any type of ordering (e.g., spatial, temporal, logical, etc.), unless stated otherwise. For example, in an embodiment in which a processor 100 includes multiple execution circuits, the terms "first execution circuit" and "second execution circuit" may be used to two of the multiple execution circuits unless stated otherwise.

When used in the claims, the term "or" is used as an inclusive or and not as an exclusive or. For example, the phrase "at least one of x, y, or z" means any one of x, y, and z, as well as any combination thereof (e.g., x and y, but not z).

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

What is claimed is:

1. An apparatus, comprising:
    a plurality of instruction queues, including:
        a first instruction queue corresponding to a first execution circuit; and
        a second instruction queue corresponding to a second execution circuit;
    a dispatch circuit configured to:
        route instruction operations into the first instruction queue from oldest to youngest such that instruction operations routed into a first subset of a plurality of entries in the first instruction queue are older than instruction operations routed into a second subset of the plurality of entries in the first instruction queue; and
    a selection circuit configured to:
        select, from the first instruction queue, a first instruction operation from the first subset of entries in the first instruction queue, wherein the first instruction operation is an oldest instruction operation in the first subset of entries that is available to issue;
        select, from the first instruction queue, a second instruction operation from the second subset of entries in the first instruction queue, wherein the second instruction operation is an oldest instruction operation in the second subset of entries that is available to issue, and wherein the second instruction operation is younger than the first instruction operation;
        wherein the selection circuit includes first and second multiplexing circuits that are configured to select between instruction operations from the first and second instruction queues, including by:
            in response to detecting that no instruction operations in the second instruction queue are available to issue for a particular clock cycle:
                select, by the first multiplexing circuit, the first instruction operation, from the first instruction queue, to issue to the first execution circuit for the particular clock cycle; and
                select, by the second multiplexing circuit, the second instruction operation, from the first instruction queue, to issue to the second execution circuit for the particular clock cycle; and
            in response to detecting that a third instruction operation in the second instruction queue is available to issue for the particular clock cycle:
                select, by the first multiplexing circuit, the first instruction operation, from the first instruction queue, to issue to the first execution circuit for the particular clock cycle; and
                select, by the second multiplexing circuit, the third instruction operation, from the second instruction queue, to issue to the second execution circuit for the particular clock cycle.

2. The apparatus of claim 1, wherein the second multiplexing circuit is further configured to select between the second instruction operation, from the first instruction queue, and the third instruction operation, from the second instruction queue, based on one or more control signals.

3. The apparatus of claim 2, wherein the one or more control signals include:
    the second instruction operation from the first instruction queue; and
    ready information for the third instruction operation.

4. The apparatus of claim 1, wherein the selection circuit is further configured to:
    select, from the second instruction queue, a fourth instruction operation, from a third subset of entries in the second instruction queue, to issue to the second execution circuit for a second particular clock cycle, wherein the fourth instruction operation is an oldest instruction operation in the third subset that is available to issue;
    select, from the second instruction queue, a fifth instruction operation from a fourth subset of entries in the second instruction queue, wherein the fifth instruction operation is an oldest instruction operation in the fourth subset that is available to issue; and
    in response to detecting that no instruction operations in the first instruction queue are available to issue for the second particular clock cycle, select, by the first multiplexing circuit, the fifth instruction operation to issue to the first execution circuit for the second particular clock cycle.

5. The apparatus of claim 4, wherein the first multiplexing circuit is configured to select between the fifth instruction operation, from the second instruction queue, and one or more instruction operations from the first instruction queue based on one or more control signals.

6. The apparatus of claim 1, wherein the dispatch circuit is further configured to:
   determine ready information based on data dependencies between instruction operations represented in the first and second instruction queues.

7. A method, comprising:
   routing, by a dispatch circuit, instruction operations into a first one of a plurality of instruction queues, wherein the first instruction queue includes a first plurality of entries configured to store information indicative of the instruction operations, and wherein the routing is performed from oldest to youngest such that instruction operations routed into a first subset of the first plurality of entries are older than instruction operations routed into a second subset of the first plurality of entries;
   selecting, by a selection circuit, a first instruction operation from the first subset of entries in the first instruction queue, wherein the first instruction operation is an oldest instruction operation in the first subset of entries that is available to issue;
   selecting, by the selection circuit, a second instruction operation from the second subset of entries in the first instruction queue, wherein the second instruction operation is an oldest instruction operation in the second subset of entries that is available to issue, and wherein the second instruction operation is younger than the first instruction operation;
   in response to detecting that no instruction operations in a second instruction queue, of the plurality of instruction queues, are available to issue for a particular clock cycle:
      selecting, by a first multiplexing circuit of the selection circuit, the first instruction operation from the first instruction queue to issue to a first execution circuit for the particular clock cycle; and
      selecting, by a second multiplexing circuit of the selection circuit, the second instruction operation from the first instruction queue to issue to a second execution circuit for the particular clock cycle; and
   in response to detecting that, for a second particular clock cycle, a third instruction operation from the first instruction queue and a fourth instruction operation from the second instruction queue are available to issue:
      selecting, by the first multiplexing circuit of the selection circuit, the third instruction operation from the first instruction queue to issue to the first execution circuit; and
      selecting, by the second multiplexing circuit of the selection circuit, the fourth instruction operation from the second instruction queue to issue to the second execution circuit.

8. The method of claim 7, wherein the second instruction queue includes a second plurality of entries, wherein the method further comprises:
   routing, by the dispatch circuit, instruction operations into the second instruction queue from oldest to youngest such that instruction operations routed into a third subset of the second plurality of entries are older than instruction operations routed into a fourth subset of the second plurality of entries;
   selecting, by the selection circuit, a fifth instruction operation, from the third subset of entries in the second instruction queue, to issue to the second execution circuit for a third particular clock cycle, wherein the fifth instruction operation is an oldest instruction operation in the third subset that is available to issue;
   selecting, by the selection circuit, a sixth instruction operation from the fourth subset of entries in the second instruction queue, wherein the sixth instruction operation is an oldest instruction operation in the fourth subset that is available to issue; and
   in response to detecting that no instruction operations in the first instruction queue are available to issue for the third particular clock cycle, selecting, by the selection circuit, the sixth instruction operation to issue to the first execution circuit for the third particular clock cycle.

9. The method of claim 7, wherein the selecting the second instruction operation to issue to the second execution circuit is performed based on a first set of one or more control signals.

10. The method of claim 9, wherein the first set of one or more control signals includes at least one of:
    the second instruction operation from the first instruction queue; or
    ready information for one or more instruction operations from the second instruction queue.

11. The method of claim 10, wherein the selecting the third instruction operation to issue to the first execution circuit is performed based on a second set of one or more control signals.

12. The method of claim 11, wherein the second set of one or more control signals includes at least one of:
    ready information for the third instruction operation; or
    the one or more instruction operations from the second instruction queue.

13. The method of claim 7, further comprising:
    determining, by the dispatch circuit, ready information based on data dependencies between instruction operations represented in the first and second instruction queues.

14. An apparatus, comprising:
    a dispatch circuit configured to route instruction operations into a plurality of instruction queues, including by:
       routing instruction operations into a first one of the plurality of instruction queues from oldest to youngest such that instruction operations in a first non-overlapping subset of entries in the first instruction queue are older than instruction operations in a second non-overlapping subset of entries; and
    a selection circuit configured to:
       select a first instruction operation from the first non-overlapping subset of entries in the first instruction queue;
       select a second instruction operation from the second non-overlapping subset of entries in the first instruction queue, wherein the first instruction operation is older than the second instruction operation;
       wherein the selection circuit includes:
          a first multiplexing circuit that is configured to select between the first instruction operation, from the first instruction queue, and one or more instruction operations from a second one of the plurality of instruction queues, wherein, for a given clock cycle, the first multiplexing circuit is further configured to select the first instruction operation to issue to a first execution circuit; and
          a second multiplexing circuit that is configured to:

select, based on an indication that no instruction operations in the second instruction queue are available to issue for the given clock cycle, the second instruction operation from the first instruction queue to issue to a second execution circuit for the given clock cycle; and select, based on an indication that both the second instruction operation and a third instruction operation, from the second instruction queue, are available to issue during the given clock cycle, the third instruction operation to issue to the second execution circuit for the given clock cycle.

15. The apparatus of claim 14, wherein the second instruction queue includes third and fourth non-overlapping subsets of entries, wherein the selection circuit is further configured to:

select the third instruction operation from the third non-overlapping subset of entries in the second instruction queue;

select a fourth instruction operation from the fourth non-overlapping subset of entries in the second instruction queue;

based on an indication that no instruction operations in the first instruction queue are available to issue for the given clock cycle:

select, by the second multiplexing circuit, the third instruction operation to issue to the second execution circuit; and select, by the first multiplexing circuit, the fourth instruction operation, from the second instruction queue, to issue to the first execution circuit for the given clock cycle.

16. The apparatus of claim 14, wherein the second multiplexing circuit is further configured to select between the second instruction operation, from the first instruction queue, and the third instruction operation, from the second instruction queue, based on a first set of one or more control signals.

17. The apparatus of claim 16, wherein the first set of one or more control signals includes at least one of:

the second instruction operation from the first instruction queue; or ready information for the third instruction operation.

18. The apparatus of claim 17, wherein the first multiplexing circuit is further configured to select between the first instruction operation, from the first instruction queue, and the one or more instruction operations from the second instruction queue based on a second set of one or more control signals.

19. The apparatus of claim 18, wherein the second set of one or more control signals includes at least one of:

the one or more instruction operations from the second instruction queue; or ready information for instruction operations represented in the first instruction queue.

20. The apparatus of claim 14, wherein the dispatch circuit is further configured to:

determine ready information based on data dependencies between instruction operations represented in the first instruction queue.

* * * * *